(12) United States Patent
Cordray et al.

(10) Patent No.: US 6,577,963 B1
(45) Date of Patent: Jun. 10, 2003

(54) PROGRAMMATIC RESETTING OF CIRCUIT BREAKERS

(75) Inventors: David A. Cordray, Austin, TX (US); Jerry W. Malcolm, Austin, TX (US)

(73) Assignee: International Business Machines Corp., Armonk, NY (US)

( * ) Notice: Subject to any disclaimer, the term of this patent is extended or adjusted under 35 U.S.C. 154(b) by 251 days.

(21) Appl. No.: 09/735,602

(22) Filed: Dec. 12, 2000

(51) Int. Cl.[7] .............................. H02H 5/00; G06F 19/00
(52) U.S. Cl. ............................ 702/65; 361/71; 700/292
(58) Field of Search .............................. 702/65, 58, 59, 702/60; 361/62, 64, 66, 71, 93.4; 700/292, 293, 294, 295, 296, 297

(56) References Cited

U.S. PATENT DOCUMENTS

| | | | |
|---|---|---|---|
| 4,200,862 A | | 4/1980 | Campbell et al. |
| 4,994,934 A | * | 2/1991 | Bouhenguel ................. 361/71 |
| 5,185,705 A | * | 2/1993 | Farrington .................. 700/292 |
| 5,388,022 A | * | 2/1995 | Ahuja ......................... 361/94 |
| 5,596,263 A | * | 1/1997 | Zavis et al. ................. 323/255 |
| 5,629,869 A | * | 5/1997 | Johnson et al. ............... 702/34 |
| 5,875,087 A | * | 2/1999 | Spencer et al. ................ 361/87 |
| 5,896,302 A | * | 4/1999 | Goodpaster ................. 700/292 |
| 6,067,483 A | * | 5/2000 | Fesmire et al. .............. 700/296 |
| 6,195,243 B1 | * | 2/2001 | Spencer et al. ................ 361/64 |
| 6,239,960 B1 | * | 5/2001 | Martin ......................... 361/86 |
| 6,246,928 B1 | * | 6/2001 | Louis et al. ................. 700/292 |
| 6,297,939 B1 | * | 10/2001 | Bilac et al. .................... 361/64 |
| 6,356,422 B1 | * | 3/2002 | Bilac et al. ................. 361/93.1 |

* cited by examiner

*Primary Examiner*—Patrick Assouad
(74) *Attorney, Agent, or Firm*—Kevin L. Daffer; Conley Rose P.C.; Marilyn S. Dawkins, IBM

(57) ABSTRACT

In a system, method and program for monitoring and control of a circuit having a circuit breaker, circuit profile information characterizing the circuit is used to determine a reset strategy for resetting of the circuit breaker when it becomes tripped. The circuit profile information may include an identification of any devices connected along the circuit, and may further include device profile information characterizing such devices. An embodiment of the method includes detecting that the circuit breaker has tripped, receiving device profile information from a device connected along the circuit, using the device profile information to formulate a reset strategy for the circuit breaker, and sending a command as part of implementing the reset strategy. An embodiment of the system includes a system controller operably coupled to the circuit and the circuit breaker, where the system controller is adapted to use circuit profile information to determine a reset strategy.

33 Claims, 4 Drawing Sheets

| | 68 | 70 | 66 |
|---|---|---|---|
| 72 | device identifier | alphanumeric identifier, e.g. "03" | |
| | device function/type | function or type, e.g. "refrigerator" | |
| 74 | device turned on? | response, e.g. "yes" | |
| | GFI tripped? | response, e.g. "no" | |
| | monitoring interval | time interval, e.g. "30 seconds" | |
| 76 | most recent current drawn | value of current | |
| | most recent power drawn | value of power | |
| | device current history | current vs. time information | |
| 78 | maximum normal current | value of current | |
| | maximum normal power | value of power | |
| 80 | restart priority | priority, e.g. "high" | |
| | number of restart attempts | number, e.g. "3" | |
| | time between restart attempts | time, e.g. "1 minute" | |
| | monitoring interval after restart | time interval | |

Fig. 4

| | 84 | 86 | 82 |
|---|---|---|---|
| 88 | circuit identifier | alphanumeric identifier, e.g. "03" | |
| 90 | breaker tripped? | response, e.g. "yes" | |
| | breaker trip history | times of previous breaker trippings | |
| | number of breaker reset attempts | number, e.g. "2" | |
| 92 | received device 1 profile information | appropriate information, as described in Fig. 4, for device 1 | |
| | received device 2 profile information | appropriate information, as described in Fig. 4, for device 2 | |

Fig. 5

PROGRAMMATIC RESETTING OF CIRCUIT BREAKERS

BACKGROUND OF THE INVENTION

1. Field of the Invention

This invention relates to automatic control systems, and more particularly to monitoring and control of circuits governed by circuit breakers.

2. Description of the Related Art

The following descriptions and examples are not admitted to be prior art by virtue of their inclusion within this section.

Electrical wiring in houses and other-buildings typically includes multiple circuits, each governed by a circuit breaker. One or more electrical devices, such as appliances, lamps, or tools, may be connected along each circuit. If an excessive amount of current flows through a given circuit, the corresponding circuit breaker is designed to "trip", or open the circuit. In this way, devices connected along the affected circuit may be protected from damage caused by the excess current, while power may be maintained to devices on other circuits. Conventionally, the breaker is manually reset to restore power to the circuit once the condition causing the breaker to trip has been corrected.

If a circuit breaker trips at a time when the building housing the circuit is unoccupied, however, resetting of the circuit breaker is generally delayed. This may be problematic in situations for which removal of power to a device on the circuit causes damage. For example, loss of power to a refrigerator or freezer may cause the stored food to become spoiled. In situations for which ambient temperatures are extremely hot or cold, loss of power to an air conditioning or heating unit may result in extreme discomfort or even danger to, for example, animals within a house. It would therefore be desirable to decrease the delay in resetting a circuit breaker that becomes tripped when manual intervention is not immediately available. Furthermore, even when a person is available to reset a tripped circuit breaker, the process can be tedious and time-consuming. Depending upon how many devices along the circuit were drawing power just prior to the tripping of the breaker, it may take some time to determine which device or devices caused the breaker to trip. Accordingly, it would also be desirable to improve the speed and accuracy of determining which devices along a circuit should be restarted after a circuit breaker trips.

SUMMARY OF THE INVENTION

The problems outlined above are in large part addressed by a system, method and program in which circuit profile information characterizing a circuit governed by a circuit breaker is used to determine a reset strategy for resetting of the circuit breaker. The circuit profile information may include an identification of any devices connected along the circuit, where the devices may include various electrical units such as appliances, light fixtures, or tools. The circuit profile information may further include device profile information corresponding to such devices. The device profile information may include, for example, a history of the current and/or power drawn by the device prior to the tripping of the circuit breaker. Other information included in the device profile information may be, for example, instructions as to whether the device should be restarted if possible after a circuit breaker is tripped, or instructions for how much time should elapse between attempts to restart the device. The circuit profile information could also include a history of previous trippings of the circuit breaker, and status and/or history information regarding any ground fault interrupters which may be connected along the circuit.

The reset strategy for resetting of the circuit breaker is a sequence of one or more events leading to the resetting of the tripped breaker. Such events may include, for example, switching of devices on or off, and/or resetting of the breaker. In an embodiment of the method, the resetting is done automatically if possible. If it is determined from the circuit profile information that automatic resetting of the breaker is unsafe or otherwise undesirable, the reset strategy may include sending an alert message soliciting manual intervention to reset the breaker. In an embodiment of the method, one or more commands are sent to implement the reset strategy. For example, an embodiment of a method for controlling a circuit governed by a circuit breaker includes detecting that the circuit breaker has tripped, receiving device profile information from a device connected along the circuit, using the device profile information to formulate a reset strategy for the circuit breaker, and sending a command as part of implementing the reset strategy. The method may further include sending a query to the device before receiving the device profile information.

An embodiment of a system described herein for controlling a circuit having a circuit breaker includes a system controller operably coupled to the circuit and the circuit breaker, where the system controller is adapted to use circuit profile information to determine a reset strategy. The circuit profile information may include device profile information, and the system controller may include a processor, a transmitter adapted to send a query to a device connected along the circuit, a receiver adapted to receive device profile information from the device, and a storage medium adapted to store the device profile information. In further embodiments, the system may further include a device controller coupled to the circuit and to the device, where- the device controller is adapted to receive a query or command from the system controller. The device controller may include a processor, a receiver adapted to receive the query or command, a transmitter adapted to send device profile information, and a storage medium adapted to store the device profile information.

In addition to the method and system described above, a computer-usable carrier medium is contemplated herein. The carrier medium may be a storage medium, such as a magnetic or optical disk, a magnetic tape, or a memory. In addition, the carrier medium may be a transmission medium, such as a wire, cable, or wireless medium along which data or program instructions are transmitted, or a signal carrying the data or program instructions along such a wire, cable or wireless medium. The carrier medium may contain program instructions executable for carrying out embodiments of the methods described herein, and/or data such as the circuit profile information and device profile information described above.

BRIEF DESCRIPTION OF THE DRAWINGS

Other objects and advantages of the invention will become apparent upon reading the following detailed description and upon reference to the accompanying drawings in which:

FIG. 4 illustrates exemplary device profile information as may be included on the storage medium of FIG. 3(b);

FIG. 5 illustrates exemplary circuit profile information as may be included on the storage medium of FIG. 3(a)

Figure 1:
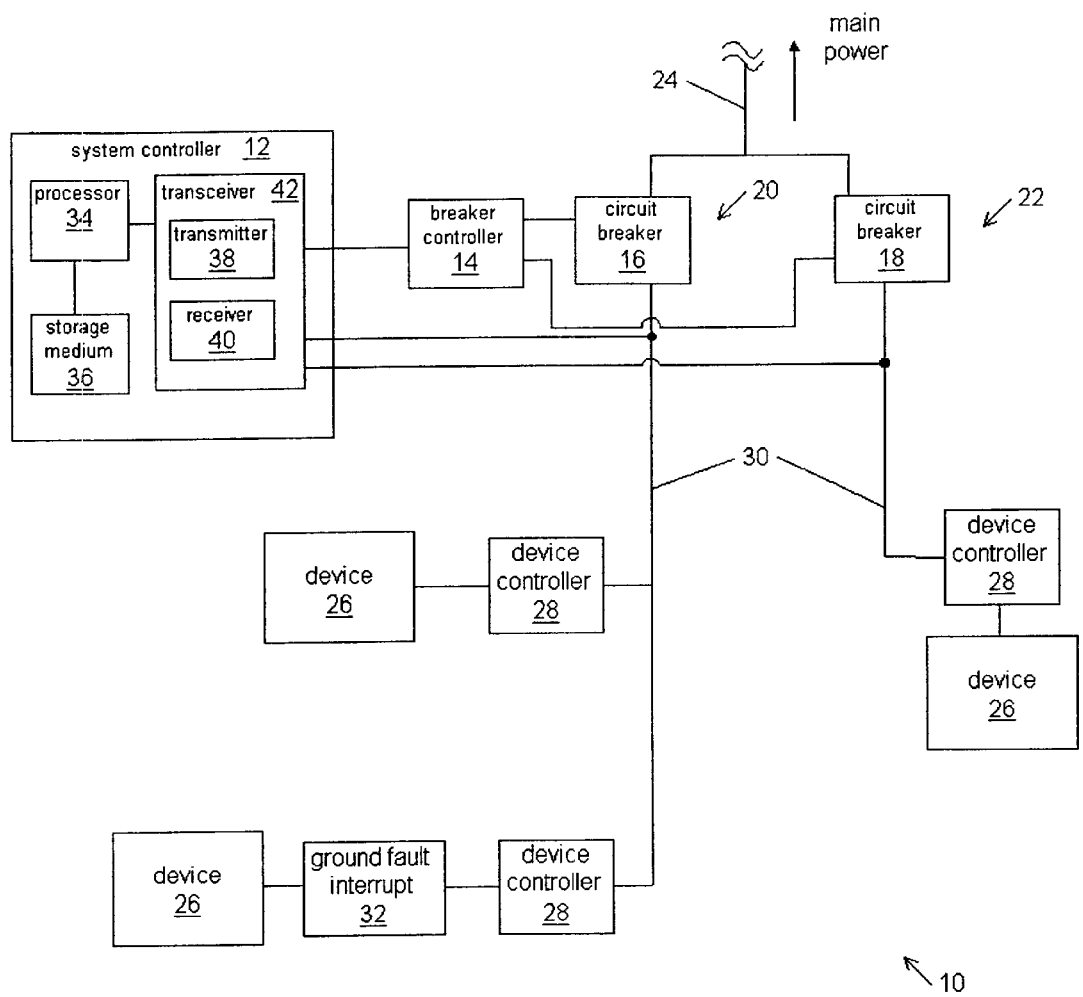
FIG. 1 is a block diagram illustrating an embodiment of a system for monitoring and control of circuits governed by circuit breakers.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

An exemplary embodiment of a system for monitoring and/or controlling circuits having circuit breakers is shown in FIG. 1. System 10 includes a system controller 12 coupled to a breaker controller 14, where breaker controller 14 is coupled to circuit breakers 16 and 18. Circuit breakers 16 and 18 govern circuits 20 and 22, respectively, into which an incoming power line 24 is divided. In the embodiment of FIG. 1, circuits 20 and 22 include devices 26 connected along circuit power lines 30. Devices 26 may include various electrically-powered devices, such as appliances, light fixtures, tools, computers, etc. The devices may be plugged into outlets or otherwise wired into the circuits. In this embodiment, each of devices 26 is associated with a device controller 28, which may communicate with system controller 12 and control and/or monitor the device. Other elements such as ground fault interrupter (GFI) 32 may also be associated with devices along the circuit.

In the embodiment of FIG. 1, system controller 12 is coupled directly to circuit power lines 30, such that the power lines also serve as communication lines. Such an embodiment may use a protocol similar to the "X10" protocol used in some home automation systems. Use of the X10 protocol in the United States may involve sending pulses of a 120 KHz signal along the same line used by the 60 Hz line power. A similar protocol, which supports functions including sending commands and/or queries from a controller to devices and sending information from the devices to a controller, could be used in the embodiment of FIG. 1. Other types of communication between system controller 12, devices 26 and circuit breakers 16 and 18 could be used, however. For example, control circuit wiring separate from the power lines could be used, or wireless transmission of control signals could be employed in some embodiments.

As shown in FIG. 1, system controller 12 may include a processor 34 coupled to a storage medium 36. Storage medium 36, and other storage media described herein, may include volatile or non-volatile memory (e.g., read-only memory or random access memory), a magnetic or optical disk, or a magnetic tape. The processor may also be coupled to a transceiver 42 for the controller, including a transmitter 38 and receiver 40. The lines extending from transceiver 42 to breaker controller 14 and circuits 20 and 22 are intended to represent lines for communication in either direction; details of specific connections to the transmitter and receiver are not shown. Device controllers 28 may include similar elements, as shown by the block diagram of FIG. 2. Processor 44 may be coupled to storage medium 46 and transceiver 48. System-side transceiver 48 may include a transmitter 52 and receiver 54 for communicating with a system controller such as system controller 12. Processor 44 of device controller 28 may be adapted to provide one or more control signals 50 to its associated device 26. In some embodiments, the system is configured such that device controllers 28 and breaker controller 14 are operational even when circuit breakers 16 and 18 are tripped. Such configurations may involve, for example, having a separate power circuit for the controllers other than power lines 30, or having battery backup power for the controllers.

Figure 2:
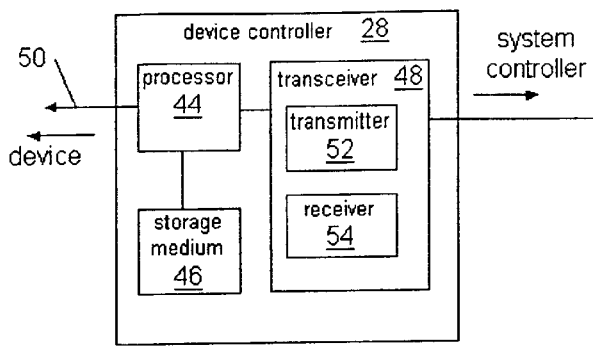
FIG. 2 is a block diagram illustrating an embodiment of a device controller as included in the system of FIG. 1.

In FIGS. 1–2 and any other block diagrams appearing herein, the blocks are intended to represent functionality rather than specific structure. Implementation of the represented system using circuitry and/or software could involve combination of multiple blocks into a single circuit, device or program, or combination of multiple circuits, devices and/or programs to realize the function of a block. For example, instead of a single breaker controller 14, circuit breakers 16 and 18 could have separate controllers, and a controller could be integrated into a package with a circuit breaker. Similarly, device controllers 28 and or GFI 32 may be included within the corresponding devices 26 in some cases. The order in which GFI 32 and device controller 28 are connected could also be varied. As another example, transmitters and receivers may not necessarily be combined into a transceiver circuit or chip such as transceivers 42 and 48. Furthermore, blocks in the block diagrams may be interconnected differently to achieve similar functionality. For example, in some embodiments system controller 12 may be connected to the circuits on the opposite side of the circuit breakers than shown in FIG. 1. If a protocol involving transmission along the power lines using a higher-frequency pulse is used in such an embodiment, a tripped breaker might be "bridged" with a capacitive circuit allowing transmission of the control signals without connecting the line voltage. Such connections, along with the controller power configurations discussed above, may be useful in communicating with devices along a circuit having a tripped breaker. System controller 12 may in some embodiments be in a different building than circuits 20 and 22, and may communicate with the circuits over power lines or other control circuit links as discussed above. In this way, the circuits could be controlled remotely, such as from a location associated with a utility company. Alternatively or in addition, system controller 12 may be in communication with another controller at a remote location.

Figure 3:
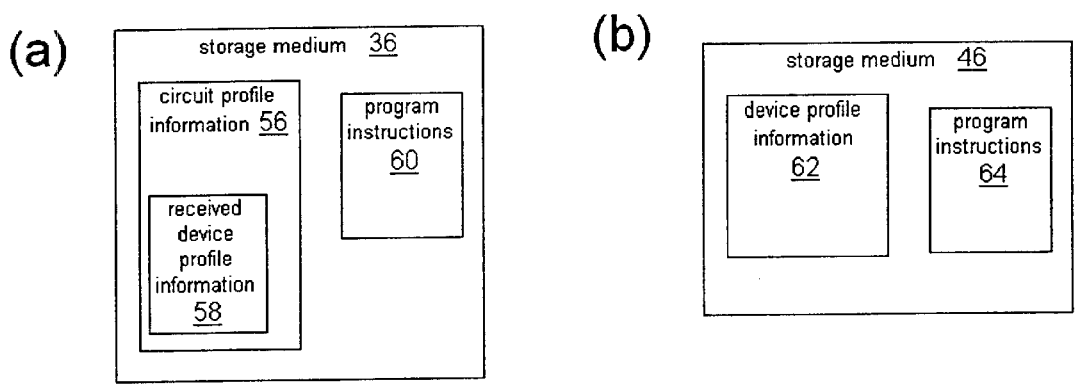
FIG. 3 is a block diagram illustrating exemplary contents of storage media shown in FIGS. 1 and 2.

Examples of data which may be stored on the storage media of FIGS. 1 and 2 are illustrated by the block diagrams of FIG. 3. Storage medium 36, from system controller 12 of FIG. 1, is shown in FIG. 3(a). In this embodiment, storage medium 36 includes circuit profile information 56 and program instructions 60. Circuit profile information 56, described further below in the discussion of FIG. 5, may include various information characteristic of one or more circuits governed by circuit breakers. Included in such circuit profile information may be received device profile information 58. Received device profile information 58 is information received from and characteristic of one or more devices within a circuit. The information may be sent from a device (via its device controller) to the system controller including storage medium 36 at regular intervals as part of a monitoring application. Alternatively, information 58 may be received in response to one or more queries from the system controller to a device. Such queries may be made at regular intervals during monitoring and/or in response to a tripping of a circuit breaker. In some embodiments, therefore, the received device profile information may already be in place at the time a circuit breaker trips, such that no further information is needed to determine a reset strategy for the breaker. Alternatively, some or all of received device profile information 58 may be received after tripping of the breaker. Program instructions 60 may include instructions executable to carry out various functions of system controller 12, such as monitoring of a circuit, determination of a reset strategy in response to tripping of a circuit breaker, and/or implementation of a reset strategy. In some embodiments, at least a portion of program instructions 60 and/or circuit profile information 56 could be implemented using a rules database, or a database incorporating rules for determining responses to particular events.

Storage medium 46, from device controller 28 of FIG. 2, is shown in FIG. 3(b). In this embodiment, storage medium 46 may include device profile information 62 and program instructions 64. Device profile information 62, described further below in the discussion of FIG. 4, may include various information characteristic of the device controlled by device controller 28. At least a portion of the device profile information may be stored on storage medium 46 at regular intervals as part of a monitoring application. Similarly, some or all of device profile information 62 may similarly be sent by device controller 28 to system controller 12. Such sending of device profile information may be done at regular intervals and/or in response to a query from system controller 12. Any portion of device profile information 62 sent to system controller 12 may be stored on storage medium 36 of FIG. 3(a) as received device profile information 58. Information 62 differs from information 58 in that not all of information 62 may be included in information 58. Furthermore, received device profile information 58 may include information relating to multiple devices 26, and therefore multiple device controllers 28. Program instructions 64 may include instructions executable to carry out various functions of device controller 28, such as monitoring of a device, or controlling of a device in response to instructions from a system controller such as system controller 12.

Turning now to FIG. 4, exemplary contents of device profile information 62 are shown. Data structure 66 contains data descriptions, or attributes, 68 and corresponding values 70 of data which may be included in device profile information 62. For values 70, descriptions of the values are given in FIG. 4, and in some cases examples of appropriate values are denoted using quotation marks. Some of the different types of information which may be included in the device profile information are described here with respect to the embodiment of FIG. 4. As shown in FIG. 4, the device profile information may include identifying information 72, such as an identification of the device in question and its function. Information 74 regarding the current status of the device may also be included, such as whether the device is currently switched on, whether any GFI associated with the device has been tripped, and the current value of any monitoring interval, or time between data collections, being used to monitor the status of the device. The device profile information may also include history information 76, such as the most recent current or power drawn by the device, or a history over some previous time interval of the current or power (possibly in the form of a series of current values at particular times). The most recent current or power drawn could be considered current status information if the device is currently operating, or history information if, e.g., the circuit breaker for the device has tripped. Information 78 regarding typical operation of the device, such as maximum current or power drawn when operating normally, may also be included. Such information may be useful, for example, for comparing to history information when diagnosing the cause of a tripped circuit breaker.

Furthermore, restart information 80 is part of device profile information 62 in the embodiment of FIG. 4. The restart information may include a priority of restarting the device after reset of a tripped circuit breaker. A refrigerator, for example, might be expected to have a high restart priority, while that of a television might be lower. In the example shown in FIG. 4, the restart priority may be, for example, "high", "medium", or "low". Alternatively, other schemes such as specific priority numbers could be used. Restart information 80 could also include information as to the number of times restart of the device should be attempted before manual intervention is required. For a device such as a computer, for example, it may be desirable to monitor all restarts in person, such that the number of restarts would be set at zero. A time interval needed between restart attempts may also be included (to prevent overheating of a device, for example). Furthermore, a monitoring interval to be used for monitoring a device after restart (typically a shorter interval) may be included in restart information 80.

Exemplary contents of circuit profile information 56 are shown in FIG. 5. In a manner similar to that of FIG. 4, data structure 82 includes data descriptions 84 and values 86 of data which may be included within the circuit profile information. Values 86 are given as descriptions of appropriate values, with some exemplary values given in quotation marks. Circuit profile information 56 may include identification data 88 identifying the circuit corresponding to the profile, and circuit breaker information 90. Breaker information 90 may include, for example, status information such as whether the breaker is currently tripped, history information such as a listing of previous times that the breaker has tripped, and reset information such as the number of times resetting should be attempted before manual intervention is required. Circuit profile information 56 may further include received device profile data 92, corresponding to received device profile information 58 of FIG. 3(a). Received device profile data 92 may include data for multiple devices within the circuit, where device profile data for each device may be similar to that shown in FIG. 4.

Many other embodiments of the data structures of FIGS. 4 and 5 are possible and contemplated. "Data structure" as used herein refers to a collection of data configured so that the data may be accessed. The data of data structures 66 or 82 could be divided into multiple data structures in some embodiments. Various forms of the data structures are possible. For example, a device could be represented as an object in an object-oriented programming approach, and data such as that in FIG. 4 could be represented as attributes of the object. The data structures could alternatively be in the form of lookup tables or rules databases. The data of FIGS. 4 and 5 could be arranged in other ways. For example, a circuit breaker could be considered a device along the circuit in some embodiments, and circuit breaker information 90 could instead be classified as received device profile information. In other embodiments, the data structures of FIGS. 4 and 5 could contain more or fewer pieces of data. For example, the device profile information of FIG. 4 could include different monitoring intervals for different quantities relating to the device, and the circuit profile information of FIG. 5 could include information for multiple circuits within data structure 82.

Figure 6:
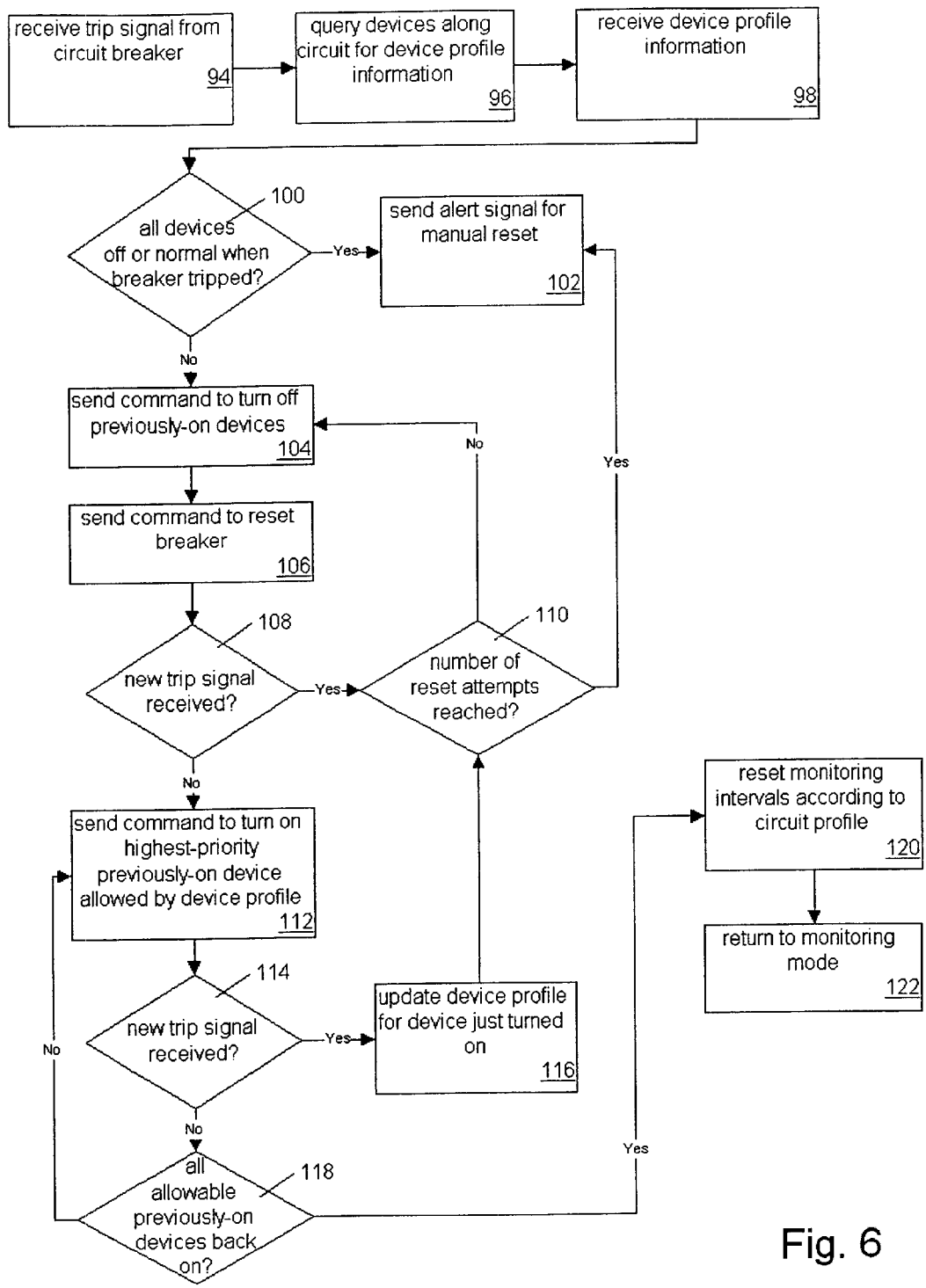
FIG. 6 is a flow diagram illustrating an embodiment of a method for responding to a tripped circuit breaker.

A flow diagram illustrating an embodiment of a method for responding to a tripped circuit breaker is shown in FIG. 6. This method may be carried out by a system controller such as system controller 12 of FIG. 1, in response to tripping of a circuit breaker such as circuit breakers 16 and 18 of FIG. 1. After a trip signal from a circuit breaker is received (box 94), devices along the circuit are queried to obtain device profile information (boxes 96 and 98). The received device profile information may include information similar to that shown in FIG. 4, generally relating to, for example, status of the devices at the time of the breaker tripping and restart requirements for the devices. In the embodiment of FIG. 6, if the received device profile information indicates that all of the devices were either turned off or operating normally (e.g., no excessive current or power draw) at the time the breaker tripped, the breaker trip is treated as an intentional shutdown, as for a repair. In this case ("yes" branch of decision box 100), an alert signal reporting the breaker status is sent so that a manual reset may be performed. If, on the other hand, the received device profile information indicates that one or more devices were on and not operating normally, an automatic reset procedure is attempted. Commands are sent to turn off any devices which remain switched on (box 104), and to reset the circuit breaker (box 106). A command to turn off a device may be sent to a device controller such as device controller 28 of FIG. 1, while one to reset the circuit breaker may be sent to a circuit breaker controller such as breaker controller 14 of FIG. 1. If a trip signal is again received, indicating that the breaker reset failed ("yes" branch of decision box 108), and if the number of allowed reset attempts has been reached ("yes" branch of decision box 110), no further automatic reset is attempted. The number of allowed reset attempts may be included in circuit profile information such as circuit profile information 56. If the number of reset attempts has not yet been reached, steps 104 and 106 are repeated in another attempt to reset the breaker.

If the breaker is reset successfully with all devices turned off ("no" branch of decision box 108), a command may be sent to turn on the highest-priority device which was on at the time the breaker originally tripped, consistent with the device profile information (box 112). Such sending of a command in a manner consistent with the device profile information could involve, for example, not turning on a device for which the allowed number of restarts is zero, or not turning on a device which was drawing excessive current or power at the time the breaker originally tripped. If a new trip signal is received upon turning on a device ("yes" branch of decision box 114), the device profile information for the newly-started device may be updated to indicate that starting of the device caused the breaker to trip (box 116). In this way, restart of the device may be avoided in subsequent reset procedures. If the allowed number of resets has not been reached, the reset procedure is started over at step 104. If a device is turned on without tripping the breaker ("no" branch of decision box 114), the embodiment of FIG. 6 includes turning on remaining previously-on devices which may be turned on according to the device profile information and reset strategy, until all such devices have been turned on (decision box 118). Monitoring intervals for restarted devices may be reset following the restart (box 120), and the circuit controller returns to a monitoring mode (box 122). It may be desirable, for example, to monitor more closely (use shorter intervals) for some period of time after restart of a device. Receipt of a new trip signal restarts the method at step 94.

In the embodiment of FIG. 6 some steps, such as steps 100, 110, 112 and 118 can be considered to be involved in using circuit profile information to determine a reset strategy for resetting a tripped circuit breaker. Some steps, such as steps 102, 104, 106, 112, 116, and 120 may be considered to be involved in implementing such a reset strategy, where some steps may contribute to both determining the strategy and implementing it. The reset strategy illustrated by FIG. 6 is merely an exemplary embodiment, and many other approaches could be used, depending upon the particular circuit involved. Furthermore, variations of the method of FIG. 6 could be used to implement the same general reset strategy. For example, steps 96 and 98 may be omitted in embodiments for which the device profile information needed is sent by the device controllers without need for a query from the system controller. Furthermore, steps 120 and 122 could be omitted if monitoring of the circuit is not performed between trippings of the circuit breaker.

Program instructions, such as instructions 60 of FIG. 3(a), implementing methods such as those illustrated by FIG. 6 may be transmitted over or stored on a carrier medium. Data such as circuit profile information 56 or device profile information 62 of FIG. 3 may also be transmitted over or stored on such a carrier medium. The carrier medium may be a transmission medium such as a wire, cable, or wireless transmission link, or a signal traveling along such a wire, cable or link. The carrier medium may also be a storage medium, such as storage media 36 and 46, where a storage medium may include a volatile or non-volatile memory (e.g., read-only memory or random access memory), a magnetic or optical disk, or a magnetic tape.

It will be appreciated by those skilled in the art having the benefit of this disclosure that this invention is believed to provide a system and method for monitoring and/or control of a circuit having a circuit breaker. Furthermore, it is also to be understood that the form of the invention shown and described is to be taken as exemplary, presently preferred embodiments. Various modifications and changes may be made without departing from the spirit and scope of the invention as set forth in the claims. For example, the system and methods described herein may be implemented using many combinations of hardware and/or software, and at one or more of many different levels of hardware and/or software, as is the case with many computer-related applications. It is intended that the following claims be interpreted to embrace all such modifications and changes.

What is claimed is:

1. A method of responding to a tripped circuit breaker, said method comprising:

receiving circuit profile information characterizing the circuit governed by the circuit breaker; and determining a reset strategy for resetting of the circuit breaker using the circuit profile information.

2. The method as recited in claim 1, further comprising transmitting one or more commands to implement the reset strategy.

3. The method as recited in claim 1, wherein the circuit profile information comprises an identification of one or more devices connected along the circuit.

4. The method as recited in claim 3, wherein said one or more devices comprise an appliance or a light.

5. The method as recited in claim 3, wherein the circuit profile information further comprises device profile information for each of the one or more devices.

6. The method as recited in claim 3, wherein the device profile information comprises an amount of current drawn by the corresponding device at a time just prior to tripping of the circuit breaker.

7. The method as recited in claim 3, wherein said device profile information comprises a device restart priority characterizing the importance of restarting the corresponding device.

8. The method as recited in claim 3, wherein said device profile information comprises a device restart time interval characterizing a required time interval before an attempted restart of the corresponding device.

9. The method as recited in claim 1, wherein the circuit profile information is stored on a storage medium prior to tripping of the circuit breaker.

10. The method as recited in claim 1, further comprising obtaining the circuit profile information prior to said using the circuit profile information, wherein said obtaining the circuit profile information comprises sending a query to a device connected along the circuit.

11. The method as recited in claim 1, wherein the circuit profile information comprises a history of previous trippings of the circuit breaker.

12. A system for controlling a circuit having a circuit breaker, said system comprising:
   means for receiving circuit profile information characterizing the circuit; and
   means for determining a reset strategy for resetting the circuit breaker when it is tripped, wherein the circuit profile information is used in said determining.

13. The system as recited in claim 12, wherein said means for receiving and means for determining comprise a system controller.

14. The system as recited in claim 13, wherein the circuit profile information comprises device profile information, and the system controller comprises:
   a processor;
   a transmitter adapted to send a query to a device connected along the circuit;
   a receiver adapted to receive device profile information from the device; and
   a storage medium adapted to store the device profile information.

15. The system as recited in claim 14, wherein the storage medium is further adapted to store program instructions executable for implementing the reset strategy.

16. The system as recited in claim 13, further comprising a device controller coupled to the circuit and to a device connected along the circuit, wherein the device controller is adapted to receive a query or command from the system controller.

17. The system as recited in claim 16, wherein the device controller comprises:
   a processor;
   a receiver adapted to receive a query or command from the system controller;
   a transmitter adapted to send device profile information to the system controller; and
   a storage medium adapted to store the device profile information.

18. The system as recited in claim 17, wherein the device profile information comprises a history of power drawn by the device.

19. The system as recited in claim 17, wherein the device profile information comprises a device restart priority characterizing the importance of restarting the device.

20. The system as recited in claim 13, wherein the system controller is located in a building separate from that of the circuit.

21. A computer-usable carrier medium comprising circuit profile information characterizing a circuit governed by a circuit breaker, wherein the circuit profile information includes information relevant to resetting the circuit breaker when it becomes tripped.

22. The carrier medium as recited in claim 21, wherein the circuit profile information comprises a history of previous trippings of the circuit breaker.

23. The carrier medium as recited in claim 21, wherein the circuit profile information comprises device profile information characterizing a device connected along the circuit.

24. The carrier medium as recited in claim 23, wherein the device profile information comprises a device restart time interval characterizing a required time interval before an attempted restart of the device.

25. The carrier medium as recited in claim 21, further comprising program instructions executable for resetting the circuit breaker when tripped, according to a reset strategy determined using the circuit profile information.

26. A method for controlling a circuit governed by a circuit breaker, said method comprising:
   detecting that the circuit breaker has tripped;
   receiving device profile information from a device connected along the circuit;
   using the device profile information to formulate a reset strategy for the circuit breaker; and
   sending a command as a part of implementing the reset strategy.

27. The method as recited in claim 26, further comprising sending a query to the device, prior to said receiving.

28. The method as recited in claim 26, wherein the device comprises the circuit breaker, and the device profile information comprises a history of previous trippings of the circuit breaker.

29. The method as recited in claim 26, wherein said sending a command comprises sending a command to reset the circuit breaker.

30. The method as recited in claim 26, wherein said sending a command comprises sending a command to turn off the device.

31. The method as recited in claim 26, wherein said sending a command comprises transmitting an alert requesting manual intervention.

32. The method as recited in claim 26, wherein said detecting comprises receiving a signal from the circuit breaker.

33. A computer-usable carrier medium, comprising:
   first program instructions executable using a processor for detecting that a circuit breaker in communication with the processor has tripped;
   second program instructions executable using the processor for receiving device profile information from a device connected along a circuit governed by the circuit breaker;
   third program instructions executable using the processor for using the device profile information to formulate a reset strategy for the circuit breaker; and
   fourth program instructions executable using the processor for sending a command as a part of implementing the reset strategy.

* * * * *